United States Patent
Chae et al.

(10) Patent No.: US 10,727,478 B2
(45) Date of Patent: Jul. 28, 2020

(54) NEGATIVE ELECTRODE FOR LITHIUM ION SECONDARY BATTERY AND METHOD FOR MANUFACTURING THE SAME

(71) Applicant: LG CHEM, LTD., Seoul (KR)

(72) Inventors: Oh-Byong Chae, Daejeon (KR); Sang-Wook Woo, Daejeon (KR); Hee-Won Choi, Daejeon (KR); Eun-Kyung Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 16/094,075

(22) PCT Filed: Oct. 13, 2017

(86) PCT No.: PCT/KR2017/011353
§ 371 (c)(1),
(2) Date: Oct. 16, 2018

(87) PCT Pub. No.: WO2018/070847
PCT Pub. Date: Apr. 19, 2018

(65) Prior Publication Data
US 2019/0140257 A1    May 9, 2019

(30) Foreign Application Priority Data

Oct. 13, 2016    (KR) .................. 10-2016-0132948

(51) Int. Cl.
*H01M 4/02*         (2006.01)
*H01M 4/134*        (2010.01)
(Continued)

(52) U.S. Cl.
CPC ......... *H01M 4/134* (2013.01); *H01M 4/1395* (2013.01); *H01M 4/366* (2013.01);
(Continued)

(58) Field of Classification Search
CPC .... H01M 4/134; H01M 4/1395; H01M 4/366; H01M 4/382; H01M 4/623; H01M 10/052; H01M 10/0525; H01M 2004/027
See application file for complete search history.

(56) References Cited

U.S. PATENT DOCUMENTS 4,503,088 A    3/1985  Fleischer
6,835,492 B2   12/2004  Cho et al.
(Continued)

FOREIGN PATENT DOCUMENTS

EP    1976792 B1    7/2014
JP    2002-141058 A    5/2002
(Continued)

OTHER PUBLICATIONS

International Search Report (PCT/ISA/210) issued in PCT/KR2017/011353, dated Feb. 5, 2018.
(Continued)

*Primary Examiner* — Raymond Alejandro
(74) *Attorney, Agent, or Firm* — Birch, Stewart, Kolasch & Birch, LLP

(57) ABSTRACT

A negative electrode for a lithium secondary battery using lithium metal for the negative electrode and a method for manufacturing the same. The method includes forming a protective layer for dendrite prevention of the negative electrode. The method for manufacturing a negative electrode may be achieved by a process including coating a slurry containing fluorocarbon and/or fluorinated metal dispersed in a solvent onto a lithium metal layer and drying the slurry.

5 Claims, 5 Drawing Sheets

(51) Int. Cl.
*H01M 10/0525* (2010.01)
*H01M 4/1395* (2010.01)
*H01M 4/36* (2006.01)
*H01M 10/052* (2010.01)
*H01M 4/38* (2006.01)
*H01M 4/62* (2006.01)

(52) U.S. Cl.
CPC ........... *H01M 4/382* (2013.01); *H01M 4/623* (2013.01); *H01M 10/052* (2013.01); *H01M 10/0525* (2013.01); *H01M 2004/027* (2013.01)

(56) References Cited

U.S. PATENT DOCUMENTS

| | | |
|---|---|---|
| 6,964,829 B2 | 11/2005 | Utsugi et al. |
| 8,609,273 B2 | 12/2013 | Bae et al. |
| 2010/0273059 A1* | 10/2010 | Sano .................... H01M 4/134 429/231.7 |
| 2015/0207146 A1* | 7/2015 | Tanaka ................. H01M 4/133 427/122 |
| 2019/0267671 A1* | 8/2019 | Zhang ............... H01M 10/0567 |

FOREIGN PATENT DOCUMENTS

| | | |
|---|---|---|
| JP | 3812324 B2 | 8/2006 |
| KR | 2002-0091748 A | 12/2002 |
| KR | 10-2016-0052351 A | 5/2016 |
| WO | WO 2009/107964 A2 | 9/2009 |

OTHER PUBLICATIONS

Gnedenkov et al., "Fluorocarbon materials produced by the thermo destruction of polytetrafluoroethylene and possibility of theirs application in Li/(CFx)n batteries", Physics Procedia, vol. 23, 2012, pp. 86-89.

* cited by examiner

NEGATIVE ELECTRODE FOR LITHIUM ION SECONDARY BATTERY AND METHOD FOR MANUFACTURING THE SAME

TECHNICAL FIELD

The present application claims priority to Korean Patent Application No. 10-2016-0132948 filed in the Republic of Korea on Oct. 13, 2016, the disclosure of which is incorporated herein by reference. The present disclosure relates to a negative electrode for a lithium ion secondary battery and a method for manufacturing the same. More particularly, the present disclosure relates to a negative electrode for a lithium ion secondary battery using lithium metal for the negative electrode, and a method for manufacturing the same.

BACKGROUND ART

With the development of mobile electronic devices such as mobile phones or laptop computers, there is a dramatic increase in the demand for rechargeable secondary batteries as a source of energy for the mobile electronic devices. Recently, the use of secondary batteries as a source of power for hybrid electric vehicle (HEV) and electric vehicle (EV) is realized in practice. Accordingly, many studies are being made on secondary batteries that meet various demands, and in particular, the demand for lithium secondary batteries having high energy density and high discharging voltage and output is on the increase.

Lithium ion secondary batteries include carbon-based materials such as graphite, lithium metal, metal such as tin or silicone or their oxide, alloys including them as a negative electrode active material. Among them, lithium metal is more prone to ionization and has a body-centered cubic crystal structure and an atomic radius of 0.76 Å. Furthermore, lithium metal has small atomic mass (6.941) and low density (0.534 g/cc) as well as very low standard electrode potential ($-3.04$ $V_{SHE}$), so its specific capacity is very high as much as about 3860 mAh/g. However, lithium metal has a generally low melting temperature of 180.54° C., and has a safety problem, for example, an internal short of batteries caused by dendrite growth. To solve this problem, studies have been made to stabilize the surface of lithium metal by coating the surface with an electrochemically stable material, for example, a polymer or inorganic film. U.S. Pat. No. 4,503,088 forms a protective coating by applying an epoxy resin solution to a lithium metal negative electrode, but there is a high likelihood that the solvent in the solution may directly contact the lithium metal, resulting in by-product formation, and bubbles are generated at the interface. Besides, explosion reaction that may occur due to the exposure to moisture and difficulties in electrode manufacturing process are at issue.

DISCLOSURE

Technical Problem

The present disclosure is designed to solve the above technical problem, and therefore, the present disclosure is directed to providing a negative electrode with a protective layer for preventing the formation of dendrite on the negative electrode surface and a method for manufacturing the negative electrode. It will be apparent that other objects and advantages of the present disclosure may be achieved by the means stated in the appended claims and combination thereof.

Technical Solution

To solve the above-mentioned technical problem, the present disclosure provides a method for manufacturing a negative electrode for a lithium ion secondary battery.

A first aspect of the present disclosure relates to the method for manufacturing a negative electrode, and the method includes (S10) preparing a lithium metal layer; (S20) dispersing fluorocarbon and/or fluorinated metal in a solvent to prepare a slurry for manufacturing a protective layer; (S30) coating the slurry onto the lithium metal layer; and (S40) drying the slurry, wherein the fluorocarbon is a solid at room temperature, and the fluorinated metal is represented by the following [Chemical formula 1]:

$MeF_x$         [Chemical formula 1]

where Me is at least one of Fe, Co, Mn, Ni, Cu, V, Bi and Cr, and x is between 0.1 and 10.0.

According to a second aspect of the present disclosure, in the first aspect, the fluorocarbon is a solid at room temperature, and is at least one selected from the group consisting of $(CF)_n$ ($1.0 \leq n \leq 100{,}000$), $(C_2F)_n$ ($1.0 \leq n \leq 100{,}000$), $C_{60}F_x$ ($0.1 \leq x \leq 60.0$) and $CF_x$ ($0.1 \leq x \leq 1.0$).

According to a third aspect of the present disclosure, in any one of the first and second aspects, the drying of the (S40) is performed in a range of between 80° C. and 120° C., and under a vacuum condition.

According to a fourth aspect of the present disclosure, in any one of the first to third aspects, the solvent of the (S20) is at least one selected from the group consisting of NMP, acetone and hexane.

According to a fifth aspect of the present disclosure, in any one of the first to fourth aspects, the method further includes (S11) dispersing polyfluorovinylidene in a solvent.

According to a sixth aspect of the present disclosure, in the fifth aspect, a content ratio of the polyfluorovinylidene to an ingredient A in the slurry of the (S20) is between 100 parts by weight and 300 parts by weight.

Additionally, the present disclosure relates to a negative electrode for a lithium ion secondary battery. A seventh aspect of the present disclosure relates to the negative electrode, and the negative electrode includes a lithium metal layer; and a negative electrode protective layer on a surface of the lithium metal layer, wherein the negative electrode protective layer includes LiF, and the LiF is produced from a reaction between lithium of the lithium metal layer and fluorocarbon which is in a solid state at room temperature condition.

Additionally, the present disclosure relates to a negative electrode for a lithium ion secondary battery. An eighth aspect of the present disclosure relates to the negative electrode, and the negative electrode includes a lithium metal layer; and a negative electrode protective layer on a surface of the lithium metal layer, wherein the negative electrode protective layer is formed by the method according to any one of the above-mentioned aspects.

According to a ninth aspect of the present disclosure, in the eighth aspect, the negative electrode protective layer has a thickness of between 0.1 μm and 100 μm.

Additionally, the present disclosure relates to a lithium ion secondary battery including a positive electrode, a negative electrode and a separator, wherein the negative electrode is defined in the seventh aspect.

Advantageous Effects

The negative electrode according to the present disclosure has a lithium negative electrode protective layer, and provides an effect on the prevention of dendrite formation. Additionally, the method for manufacturing a negative electrode according to the present disclosure can be only performed by a simple process with a small investment cost because intricate and immoderate conditions are omitted.

BRIEF DESCRIPTION OF DRAWINGS

The accompanying drawings illustrate preferred embodiments of the present disclosure, and together with the foregoing description, serve to provide further understanding of the technical aspects of the present disclosure. However, the present disclosure should not be construed as being limited to the drawings.

MODE FOR CARRYING OUT THE INVENTION

It should be understood that the terms or words used in the specification and the appended claims shall not be construed as limited to general and dictionary meanings, but interpreted based on the meanings and concepts corresponding to technical aspects of the present disclosure on the basis of the principle that the inventor is allowed to define terms appropriately for the best explanation. Accordingly, the configuration shown in the embodiments stated herein is just a most preferred embodiment of the present disclosure, and does not represent all the technical aspects of the present disclosure, so it should be understood that many other equivalents and variations may be made thereto at the time of filing the application.

The term ⌈comprises⌋ when used in this specification, specifies the presence of stated elements, but does not preclude the presence or addition of one or more other elements, unless the context clearly indicates otherwise.

The terms ⌈about⌋ and ⌈substantially⌋ as used herein refer to the presented value or close to the value when an intrinsic allowable tolerance for manufacture and material is presented, and are used to prevent an unscrupulous infringer from unfairly exploiting the disclosure containing an accurate or absolute value to help the understanding of the present disclosure.

⌈combination(s) thereof⌋ in Markush type language as used herein, refers to a mixture or combination of one or more selected from the group consisting of elements stated in Markush type language, and specifies the inclusion of one or more selected from the group consisting of the elements.

⌈A and/or B⌋ when used in this specification, specifies ⌈either A or B or both⌋.

The present disclosure relates to a negative electrode for a lithium ion secondary battery and a method for manufacturing the negative electrode. In the present disclosure, the negative electrode for a lithium ion secondary battery includes a lithium metal layer and a negative electrode protective layer on the surface of the lithium metal layer, and the negative electrode protective layer includes LiF. In the present disclosure, the LiF may be produced from reaction between lithium of the lithium metal layer and fluorocarbon. Additionally, the LiF may be produced by reaction between a mixture of two or more selected from fluorocarbon, fluorinated metal and polyfluoro vinylidene, and lithium of the lithium metal layer.

Figure 1:
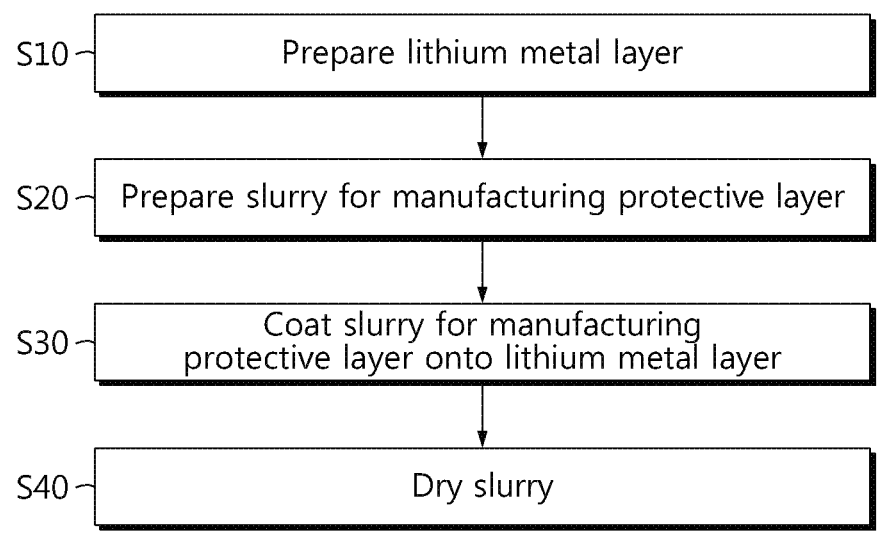
FIG. 1 is a process flowchart showing time-sequential deployment of each step of a method for manufacturing a negative electrode according to the present disclosure.

FIG. 1 is a process flowchart showing time-sequential deployment of each step of a method for manufacturing a negative electrode according to the present disclosure. Hereinafter, the method for manufacturing a negative electrode of the present disclosure is described in more detail with reference to FIG. 1.

A lithium metal layer is prepared first (S10). The lithium metal layer serves as a negative electrode in a lithium ion secondary battery, and may be a lithium metal plate or a metal plate having a lithium metal thin film on a current collector. The current collector may be any one metal selected from the group consisting of copper, aluminum, stainless steel, titanium, silver, palladium, nickel, their alloys and their combinations. In the present disclosure, a method for forming the lithium metal thin film is not particularly limited, and may include known methods for forming a metal thin film such as a lamination method and a sputtering method. The lithium metal layer may have a controlled width to facilitate the manufacture of the electrode depending on the type of electrode. The thickness of the lithium metal layer may be from 30 μm to 500 μm. The thickness of the lithium metal layer may be 30 μm or more, 50 μm or more, 100 μm or more, 200 μm or more, 300 μm or more, or 400 μm or more, within the range. Additionally, the thickness of the lithium metal layer may be 400 μm or less, 300 μm or less, 200 μm or less, 100 μm or less, 50 μm or less, within the range.

In a specific embodiment of the present disclosure, the step of activating the surface of the lithium metal layer may be additionally performed. The surface activation step may be performed on the lithium metal layer surface using a common etching method such as mechanical etching, chemical etching, electrochemical etching and plasma etching. When the lithium metal layer surface is activated, impurity and passivation are removed from the lithium metal layer surface, and at the same time, the surface area for reaction with ingredients A and B in a slurry as described below increases, resulting in improved reactivity.

Subsequently, a slurry for manufacturing a negative electrode protective layer is prepared (S20). The slurry may be prepared by dispersing at least one of fluorocarbon and fluorinated metal in a solvent. In the specification, fluorocarbon and fluorinated metal are collectively referred to as ingredient A for convenience. In other words, the ingredient A include at least one of fluorocarbon and fluorinated metal.

In a specific embodiment of the present disclosure, the fluorocarbon is at least one selected from the group of compounds represented by the following [Chemical formula 2] to [Chemical formula 5].

 $(CF)_n$ [Chemical formula 2]

Here, n is from 1.0 to 100,000, and according to a specific embodiment of the present disclosure, n may be 100 or more, 1,000 or more, or 10,000 or more, within the range. Additionally, n may be 10,000 or less, 1,000 or less, or 100 or less, within the range.

 $(C_2F)_n$ [Chemical formula 3]

Here, n is from 1.0 to 100,000, and according to a specific embodiment of the present disclosure, n may be 100 or more, 1,000 or more, or 10,000 or more, within the range. Additionally, n may be 10,000 or less, 1,000 or less, or 100 or less, within the range.

$$C_{60}F_x$$ [Chemical formula 4]

Here, x is from 1.0 to 60.0, and according to a specific embodiment of the present disclosure, x may be 1 or more, 10 or more, or 30 or more, within the range. Additionally, x may be 50 or less, 40 or less, 30 or less, 10 or less, or 5 or less, within the range.

$$CF_x$$ [Chemical formula 5]

Here, x is from 0.1 to 1.0.

Additionally, in the present disclosure, the fluorocarbon is preferably in solid state, for example, powder, at room temperature.

Additionally, in the present disclosure, the fluorinated metal may be represented by the following [Chemical formula 1], and in [Chemical formula 1], Me is at least one of Fe, Co, Mn, Ni, Cu, V, Bi and Cr, and x is from 0.1 to 10.0, or from 1.0 to 5.0.

$$MeF_x$$ [Chemical formula 1]

In the slurry, the solvent is a dispersant that disperses the ingredient A described above and ingredient B as described below, and includes, for example, N-methyl-2-pyrrolidone (NMP), acetone and hexane, but is not limited thereto. The solvent is, for example, NMP.

In a specific embodiment of the present disclosure, the slurry may further include polyfluoro vinylidene-based resin (ingredient B) (hereinafter, PVdF-based resin). In this case, the slurry may be prepared by a method that before adding the ingredient A to the solvent, introduces the ingredient B into the solvent to the solvent to prepare a polymer solution, and adds and disperses the ingredient A. In this instance, the ingredient B is present in an amount of from 100 parts by weight to 300 parts by weight on the basis of 100 parts by weight of the ingredient A.

In a specific embodiment of the present disclosure, the PVDF-based resin may be copolymer resin of vinylidene-fluoride (VDF) resin with at least one comonomer selected from hexafluoropropylene (HFP), chlorotrifluoroethylene (CTFE), hexafluoroisobutylene, perfluorobutyl ethylene, perfluoro propyl vinyl ether (PPVE), perfluoro ethyl vinyl ether (PEVE), perfluoro methyl vinyl ether (PMVE), perfluoro-2,2-dimethyl-1,3-dioxol (PDD) and perfluoro-2-methylene-4-methyl-1,3-dioxolane (PMD). In a specific embodiment of the present disclosure, the comonomer is hexafluoropropylene (HFP) and/or chlorotrifluoroethylene (CTFE). The content of the comonomer is not particularly limited when the content is in the range of 5 to 50 weight % on the basis of the total polyfluoro vinylidene (PVDF)-based copolymer.

Furthermore, in a specific embodiment of the present disclosure, the PVDF-based polymer resin includes at least one selected from the group consisting of polyvinylidene fluoride, polyvinylidene fluoride-co-hexafluoropropylene, polyvinylidene fluoride-co-trichloroethylene, polyvinylidene fluoride-co-tetrafluoroethylene, polyvinylidene fluoride-co-trifluoroethylene, polyvinylidene fluoride-co-trifluorochloroethylene and polyvinylidene fluoride-co-ethylene.

The slurry is prepared using an appropriate method, for example, magnetic stirring, so that the ingredient A and the ingredient B are in uniformly dispersed phase in the above-described solvent.

Subsequently, the slurry is coated onto the lithium metal layer (S30). A method for coating the slurry includes appropriate known coating methods, for example, dip coating, doctor blade, and slot die coating.

Subsequently, the coated slurry is dried (S40). To accelerate the drying of the solvent, for example, NMP, in the slurry, the drying may be performed under vacuum condition. Additionally, the drying may be performed in the temperature range between 80° C. and 120° C. Because the melting point of lithium metal is about 180.5° C., it is desirable to control the drying temperature below the melting point of lithium metal. Through the drying step, lithium metal reacts with the ingredient A and the ingredient B, forming a LiF protective layer. In this process, the ingredient A reacts as below:

$$L^+ + CF_x \rightarrow xLiF + C$$

$$L^+ + MeF_x \rightarrow xLiF + Me$$

Additionally, in the case of the ingredient B, formation of LiF is not so much as the ingredient A. A small amount of F exposed to the surface reacts with Li to produce LiF, and most of the ingredient B acts as a binder while maintaining its structure.

Through these steps, a protective layer is formed on the surface of the lithium metal layer of the negative electrode. The thickness of the negative electrode protective layer (LiF protective layer) may be from 0.1 to 500 μm. In another embodiment, the thickness may be from 0.1 μm to 100 μm. Furthermore, in a specific embodiment of the present disclosure, the thickness of the negative electrode protective layer may be 0.1 μm or more, 1 μm or more, 5 μm or more, 10 μm or more, 30 μm or more, 50 μm or more, 70 μm or more, or 80 μm or more, within the range. The thickness may be 80 μm or less, 70 μm or less, 50 μm or less, 30 μm or less, 10 μm or less, 5 μm or less, 3 μm or less, or 1 μm or less, within the range.

In addition, the present disclosure provides a secondary battery including the negative electrode according to the present disclosure. The secondary battery includes a positive electrode (i.e. cathode), a negative electrode (i.e. anode) and a separator, and the negative electrode is one according to the present disclosure.

In the present disclosure, the positive electrode includes a positive electrode current collector and a positive electrode active material layer formed on at least one side surface of the current collector. The positive electrode may include a positive electrode active material, for example, lithium cobalt compounds such as $LiCoO_2$, lithium manganese oxide such as Chemical formula $Li_{1+x}Mn_{2-x}O_4$ (x=0~0.33), $LiMnO_3$, $LiMn_2O_3$, $LiMnO_2$; Ni-site lithium nickel oxide represented by Chemical formula $LiNi_{1-x}M_xO_2$ (M=Mn, x=0.01~0.3); lithium manganese composite oxide represented by Chemical formula $LiMn_{2-x}M_xO_2$ (M=Co, Ni, Fe, Cr, Zn or Ta, x=0.01~0.1) or $Li_2Mn_3MO_8$ (M=Fe, Co, Ni, Cu or Zn); $LiMn_2O_4$; $LiNi_xMn_{2-x}O_4$ (0.01≤x≤0.6) with partial substitution of alkali earth metal ion for Li in Chemical formula.

In the present disclosure, the current collector includes any type of metal with high conductivity, to which the mixed electrode material can be easily adhered, and which has no reactivity in the voltage range of electrochemical devices. The current collector is not limited to any particular type, but includes, for example, stainless steel, aluminum, nickel, titanium, sintered carbon, or aluminum or stainless steel with a surface treated with carbon, nickel, titanium, and silver. The current collector may be generally formed with the thickness of 3 to 500 μm.

In the present disclosure, the separator may include commonly used separator materials of electrochemical devices without any particular limitation. For example, the separator may include a porous polymer film and a non-woven made of at least one of polymer resins such as polyolefin, polyethyleneterephthalate, polybutyleneterephthalate, polyacetal, polyamide, polycarbonate, polyimide, polyetheretherketone, polyethersulfone, polyphenyleneoxide, polyphenylenesulfide, and polyethylenenaphthalene. In a specific embodiment of the present disclosure, the porous polymer film may be a laminated film produced by laminating two or more types of films in a sequential order.

Additionally, in the present disclosure, the separator may further have a heat resistant layer including inorganic particles and binder resin on the surface for the purpose of heat resistance stability of the separator.

Further, battery elements not stated herein, for example, a conductive material and an electrolyte solution, include those commonly used in the field of batteries, especially, lithium secondary batteries.

Hereinafter, example and comparative example of the present disclosure will be described. The following example is only an embodiment of the present disclosure and the present disclosure is not limited to the following embodiment.

EXAMPLE

Example 1

PVdF was dissolved in NMP to prepare a polymer solution, and in this instance, the concentration of PVdF was 5 wt %. $(CF_{1.1})_n$ (n=10,000) was added to prepare a slurry for manufacturing a negative electrode protective layer. Here, a weight ratio of PVdF and $(CF_{1.1})n$ was 2:1. The slurry was applied to the surface of lithium metal using a brush and dried under a vacuum at 100° C. for 1 hour to manufacture a negative electrode.

A positive electrode was manufactured as below. 96 weight % of $LiCoO_2$ as a positive electrode active material, 2 weight % of Denka black (conductive material) and 2 weight % of polyvinylidene fluoride (PVdF) (binder) were added to N-methyl-2-pyrrolidone (NMP) to prepare a positive electrode slurry. The prepared positive electrode slurry was applied to one surface of an aluminum current collector to the thickness of 65 μm, dried, pressed, and punched to a predetermined size to manufacture a positive electrode.

A polyolefin separator was interposed between the two electrodes manufactured as described above, and an electrolyte solution containing 1M $LiPF_6$ in a mixed solvent of ethylene carbonate (EC) and ethylmethyl carbonate (DEC) at the volume ratio of 50:50 was injected to fabricate a half coin cell.

Comparative Example 1

A battery was fabricated by the same method as example 1 except that a lithium metal negative electrode with no protective layer was used as the negative electrode. Comparative example 1 used the negative electrode in which lithium metal was applied to a copper thin film to the thickness of 20 μm.

Comparative Example 2

PVdF was dissolved in NMP to prepare a polymer solution, and in this instance, the concentration of PVdF was 5 wt %. The polymer solution was applied to the surface of lithium metal using a brush and dried under a vacuum at 100° C. for 1 hour to manufacture a negative electrode. A battery was fabricated by the same method as example 1 except that the negative electrode manufactured as described above was used.

Comparative Example 3

A LiF thin film was deposited on the surface of a lithium metal thin film (thickness 20 μm) using a physical vapor deposition (PVD) method. LiF powder as a raw material for deposition was put into deposition equipment (thermal evaporator, Sunic System) and evaporated at 800° C. for 1 hour through thermal evaporation to form a LiF layer deposited on the surface of the lithium metal thin film, and thus a LiF-coated lithium metal thin film was manufactured. The thickness of the deposited LiF layer was 500 nm. A battery was fabricated by the same method as example 1 except that the negative electrode manufactured as described above was used.

Comparative Example 4

A lithium metal thin film (thickness 20 μm) was treated with $CF_4$ gas to form a LiF layer on the surface of the metal thin film. The lithium metal thin film was put into a chamber, and plasma treatment was performed by applying power of 12 kW while flowing Ar gas containing 20% $CF_4$ gas at the flow rate of 0.5 L/min. The thickness of the deposited LiF layer was 500 nm. A battery was fabricated by the same method as example 1 except that the negative electrode manufactured as described above was used.

Experimental Example 1: Observation of Surface Shape of Electrode

Figure 2:
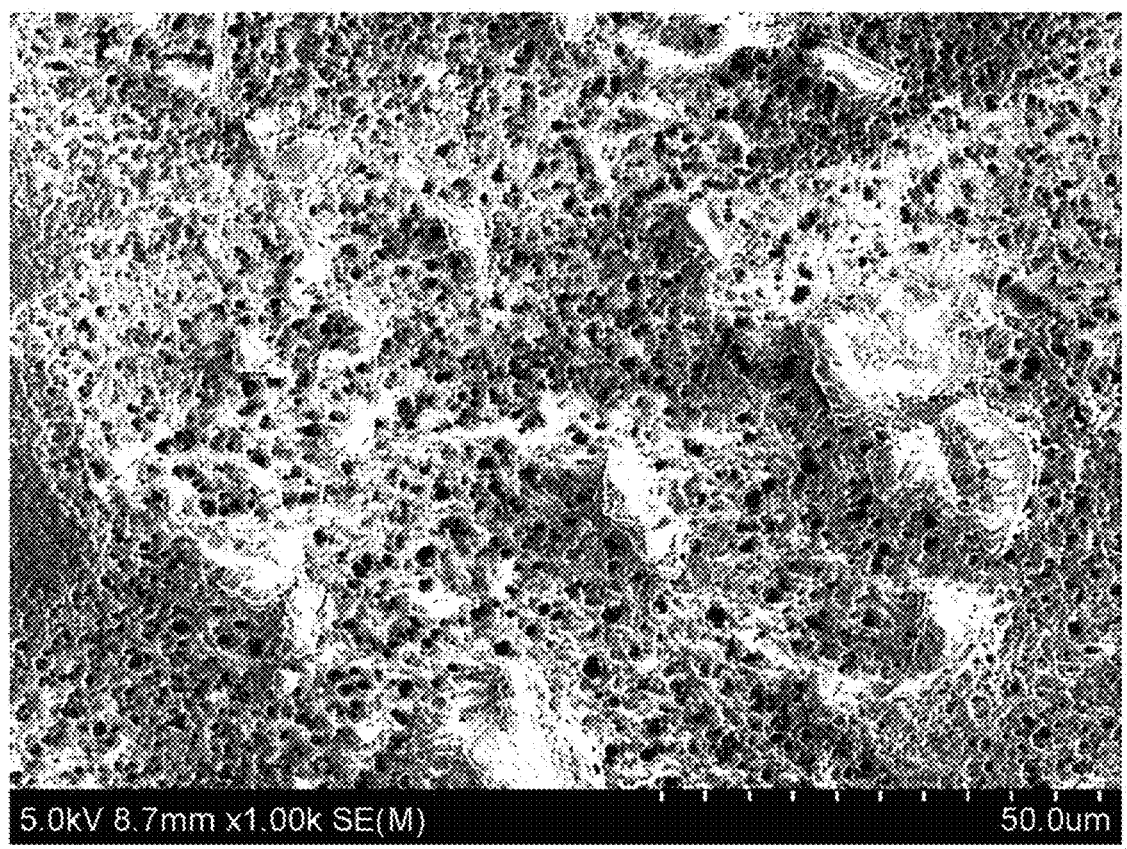
FIG. 2 is a scanning electron microscope (SEM) image showing the surface of a negative electrode according to an example of the present disclosure.
Figure 3:
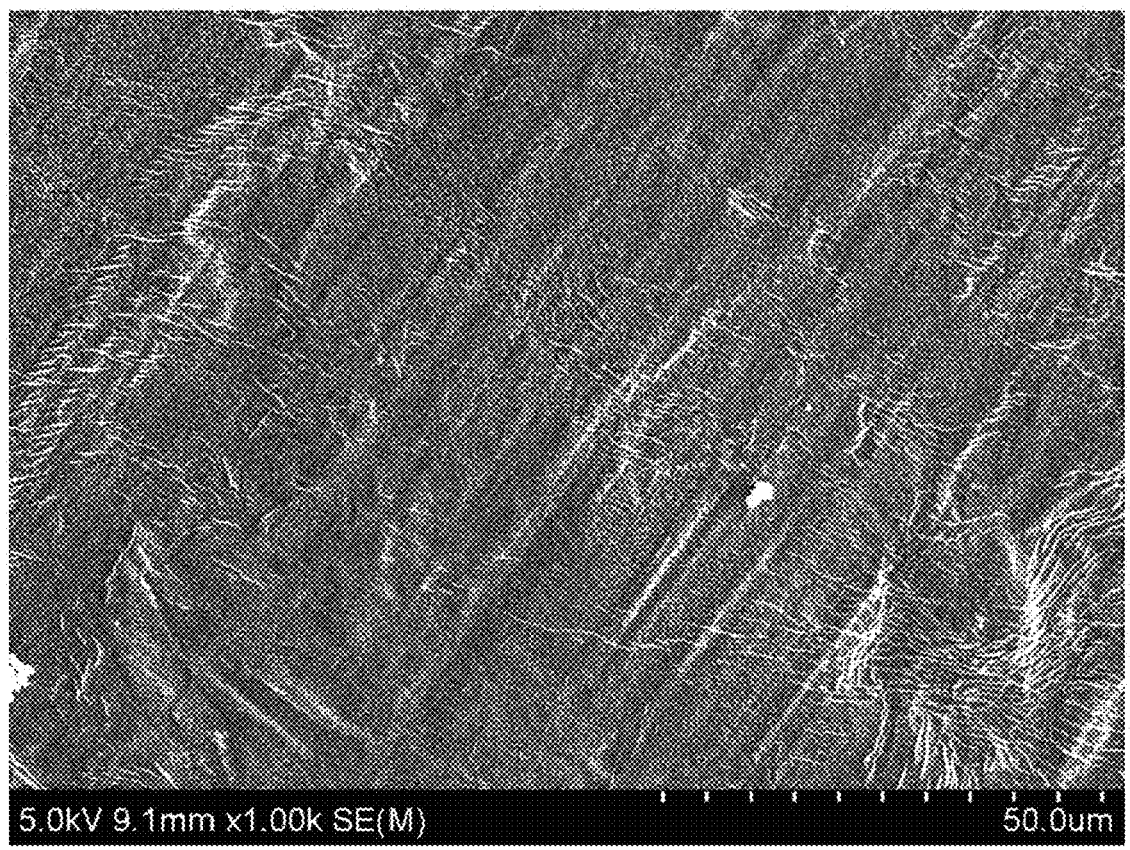
FIG. 3 is an SEM image showing the surface of a negative electrode according to comparative example 1.
Figure 4:
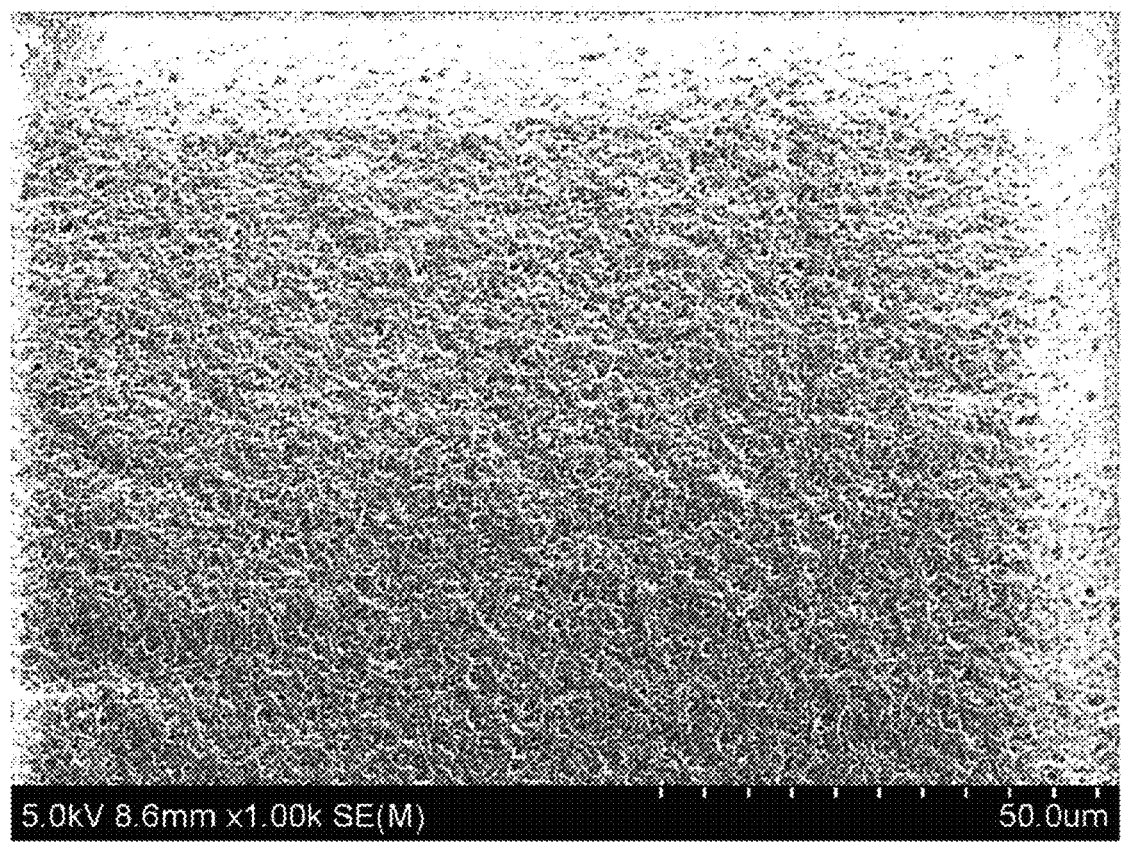
FIG. 4 is an SEM image showing the surface of a negative electrode according to comparative example 2.

The surface shape of the negative electrode manufactured in example and comparative examples 1 and 2 was observed by electron microscopy, and each image is shown in FIGS. 2, 3 and 4.

FIG. 2 shows the surface shape of the negative electrode manufactured in example 1. $CF_{1.1}$ powder of about 10 μm size is uniformly dispersed on the lithium metal surface, and exists such that it is adhered by the PVdF binder. FIG. 3 shows lithium metal without surface treatment used in comparative example 1. FIG. 4 shows the surface shape of the negative electrode manufactured in comparative example 2. It can be seen that PVdF is uniformly coated on the surface.

Experimental Example 2: Electrochemical Charging/Discharging Performance

Figure 5:
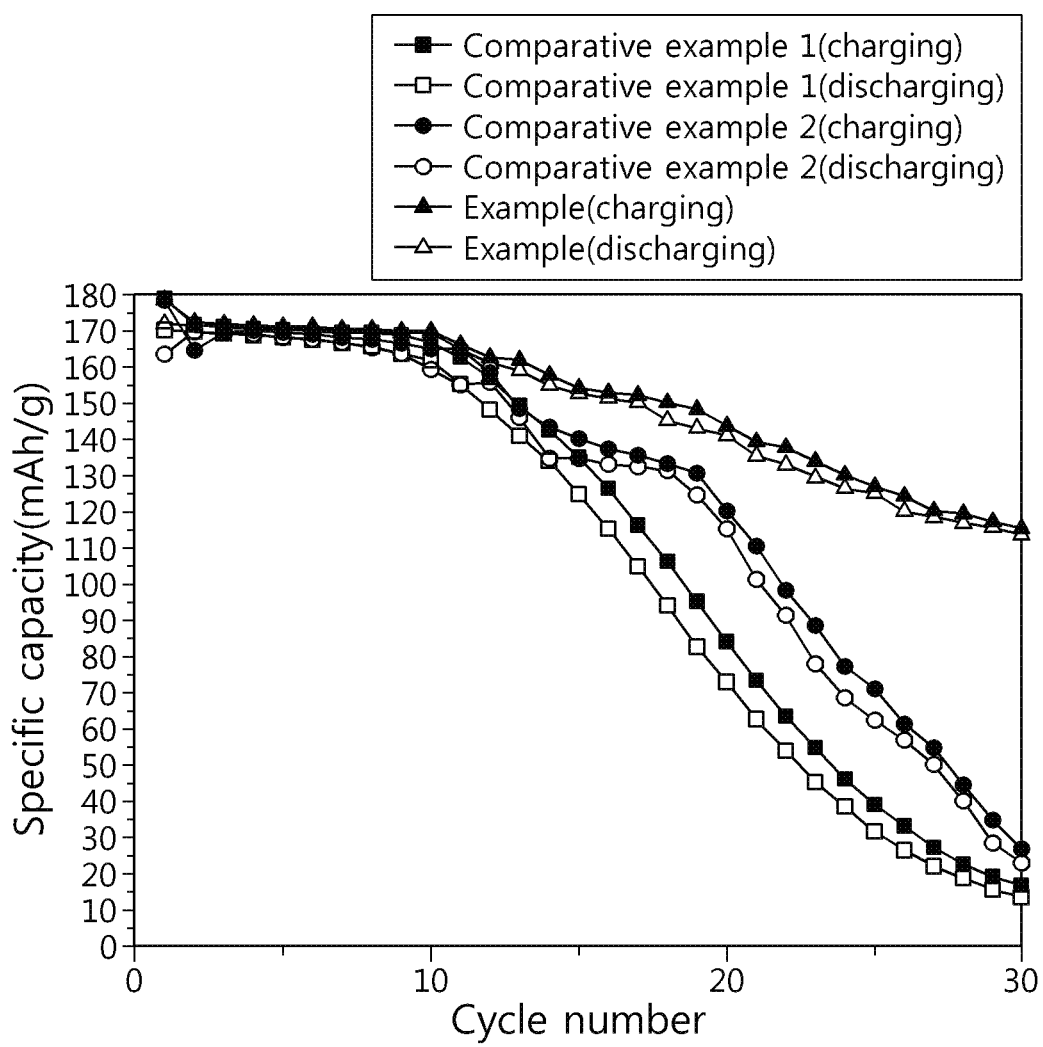
FIG. 5 is a graph plotting cycle characteristics of batteries fabricated using negative electrodes manufactured in comparative examples 1 and 2 and example.

Each battery including the negative electrodes of example and comparative examples was charged and discharged at 0.5C with the discharge termination voltage of 3.0V and the charge termination voltage of 4.4V, and charging was performed in CC/CV mode and discharging in CC mode. The charging capacity and discharging capacity were measured during charging/discharging of example and comparative examples 1 and 2, and its results are shown in FIG. 5. In initial cycles, example and comparative examples 1 and 2 all showed the same cycling performance, and after 10 cycles, a performance difference between samples appeared. In the case of comparative example 1, cycling performance sharply reduced after 10 cycles, and it was found that the capacity was reduced to 20 mAh/g at 30 cycles. Furthermore, comparative example 2 coated with PVdF alone had slightly improved performance compared to comparative example 1, but showed almost similar cycling performance. On the other hand, in the case of example 1, cycling performance started to reduce slightly after 10 cycles, but when compared to comparative example 1 and 2, it seemed that cycling performance was greatly improved and the capacity at 30 cycles was maintained at 120 mAh/g. Good cycle characteristics of example are determined that $CF_x$ coated on lithium metal forms a LiF protective film on lithium metal and would help the formation of stable dendrite during charging/discharging of lithium metal as shown in an equation for reaction $xLi+CF_x \rightarrow xLiF+C$.

Meanwhile, the reason why the batteries including the negative electrodes of comparative example 3 (deposition) and comparative example 4 (gas treatment) show poorer cycling performance than example 1 is that a very thin LiF layer of the negative electrode is partially cracked in repeated charging/discharging cycles, making lithium metal vulnerable to exposure. Accordingly, when cycles are repeated for a long time, the current concentrates thereon and dendrite is formed, and due to this influence, deterioration in charging/discharging cycle is accelerated.

TABLE 1

|  | 30 cycle capacity (mAh/g) |
|---|---|
| Example 1 | 120 |
| Comparative example 1 | 19 |
| Comparative example 2 | 27 |
| Comparative example 3 | 105 |
| Comparative example 4 | 95 |

What is claimed is:

1. A method for manufacturing a negative electrode for a lithium ion secondary battery, comprising the following steps:
    (S10) preparing a lithium metal layer;
    (S20) dispersing fluorocarbon and/or fluorinated metal in a solvent to prepare a slurry;
    (S30) coating the slurry onto the lithium metal layer; and
    (S40) drying the slurry so that the Li metal reacts with the slurry to form a LiF protective layer, wherein the drying of the (S40) is performed in a range of between 80° C. and 120° C., and under a vacuum condition, and
    wherein the fluorocarbon is a solid at room temperature, and the fluorinated metal is represented by the following [Chemical formula 1]:

$MeF_x$ [Chemical formula 1]

where Me is at least one of Fe, Co, Mn, Ni, Cu, V, Bi and Cr, and x is between 0.1 and 10.0.

2. The method for manufacturing a negative electrode for a lithium ion secondary battery according to claim 1, wherein the fluorocarbon is present and is a solid at room temperature, and is at least one selected from the group consisting of $(CF)_n$, wherein $1.0 \leq n \leq 100,000$, $(C_2F)_n$, wherein $1.0 \leq n \leq 100,000$, $C_{60}F_x$, wherein $0.1 \leq x \leq 60.0$ and $CF_x$, wherein $(0.1 \leq x \leq 1.0)$.

3. The method for manufacturing a negative electrode for a lithium ion secondary battery according to claim 1, wherein the solvent of the (S20) is at least one selected from the group consisting of N-methyl-2-pyrrolidone, acetone and hexane.

4. The method for manufacturing a negative electrode for a lithium ion secondary battery according to claim 1, further comprising:
    (S11) dispersing a polyfluorovinylidene-based resin in a solvent.

5. The method for manufacturing a negative electrode for a lithium ion secondary battery according to claim 4, wherein a content ratio of the polyfluorovinylidene-based resin to an ingredient A in the slurry of the (S20) is between 100 parts by weight and 300 parts by weight, wherein the ingredient A is at least one of fluorocarbon and fluorinated metal.

* * * * *